T. J. SLOAN.
Making Wood Screws.
No. 4,864.
Patented Nov. 24, 1846.
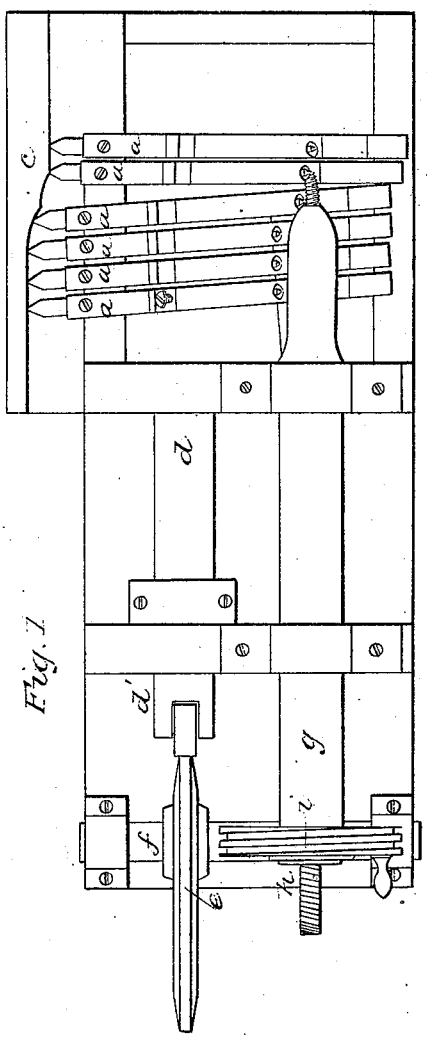
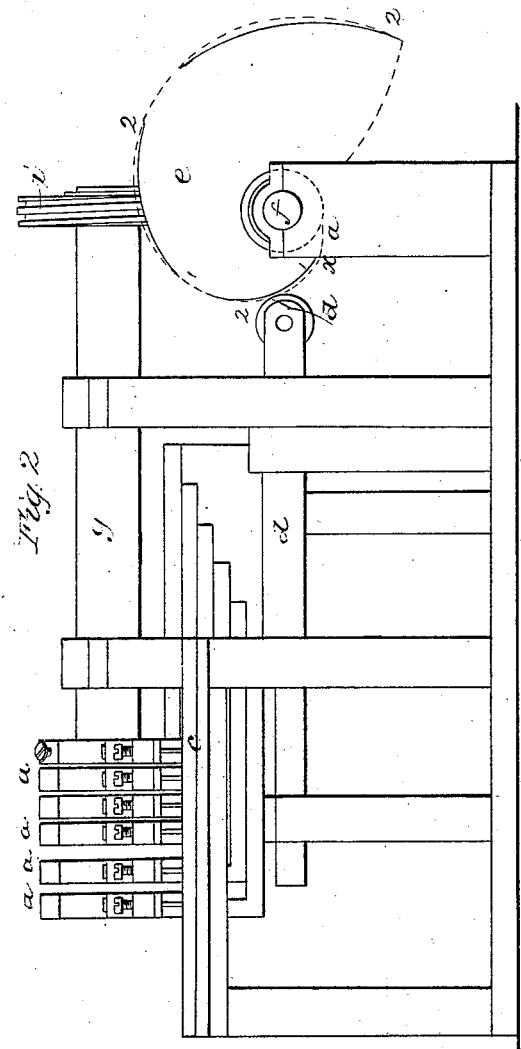

UNITED STATES PATENT OFFICE.

THOMAS J. SLOAN, OF NEW YORK, N. Y.

IMPROVEMENT IN MACHINERY FOR CUTTING THE THREADS OF POINTED SCREWS.

Specification forming part of Letters Patent No. 4,864, dated November 24, 1846.

*To all whom it may concern:*

Be it known that I, THOMAS J. SLOAN, of the city, county, and State of New York, have invented new and useful Improvements in Machinery for Cutting Wood-Screws; and I do hereby declare that the following is a full, clear, and exact description of the principle or character which distinguishes it from all other things before known, and of the manner of making, constructing, and using the same, reference being had to the accompanying drawings, making part of this specification, in which—

Figure 1 is a plan of my machine, and Fig. 2 is a side elevation of the parts of the machine which regulate the cutters.

The same letters indicate like parts in all the figures.

The nature of my invention consists in moving the cutters which cut the thread of a pointed wood-screw alternately with an accelerated and retarded motion as they approach the point so as to leave the thread of the proper form down to the point and at a regular distance apart. The construction of one modification of machinery for this purpose is as follows, reference being had to the accompanying drawings: The series of cutters $a\ a$ act one at a time consecutively on the screw-blank. They are all so attached to a frame or carriage that slides parallel with the screw-blank as to be brought up against the blank at the proper point. This is effected by a curved stationary plate $c$ or groove, in which the rests $a'\ a'$ that the tools are fastened in slide. This plate or stationary cam is so curved as to bring each tool up to the work as it arrives at the proper point by the progressive motion of the carriage, and thence runs parallel with the screw-blank to the conical point. It is then gradually pushed forward till it arrives at the extreme apex of the point, where it leaves the blank. Each succeeding cutter is made to move forward by the regular progression of the carriage $d$, corresponding with the gain of the thread to be cut until it arrives at the conical part of the revolving blank. At this point the first cutter is somewhat retarded as it moves along to the point. When the second cutter arrives at the conical point, its motion is accelerated, and so on successively each alternate cutter is accelerated or retarded, the effect of which is to cut a fine and even thread to the apex of the conical point and maintaining them (the threads) equidistant all the way. The motion is effected by a cam $e$, that acts upon the end of the carriage $d'$, where there is a friction-roller interposed, from $w$ to $x$. This cam moves the carriage forward regularly. At the point $x$ there is a small indentation 1 on the cam, by which the motion is retarded till the first tool leaves and the second is brought into action. Thence the cam is regularly progressive to the point 2, where, by a projection from the face of the cam, the motion is accelerated till the second cutter leaves, and so on through the series, the number corresponding with the number of cutters used, which in the drawings is six.

It will be obvious that many kinds of apparatus can be made to produce the effect of advancing the cutting-tool irregularly so as to produce the same effect—such, for instance, as placing the tool on an arm extending out from a shaft and moving said shaft endwise in its journals by any mechanical means; but these various devices I deem substantially the same. It is necessary in working a series of tools through sufficient to cut the thread to bring one only onto the blank at a time and at the instant the other leaves, so as to keep a continued action upon the blank till the screw is finished, which can only be done by the series above named. If the attempt is made to cut a screw by having the blank surrounded by cutters, as in some machines, a perfect thread cannot be made, as some of the cutters will be sharper than others, and if one tool only is used all its defects are transferred to the screw-thread, which is not the case where a number of cutters are used.

What I claim as my invention, and desire to secure by Letters Patent, is—

1. Retarding and accelerating the motion of the alternate cutters in making pointed screws, substantially in the manner and for the purpose set forth.

2. The employment of a series of cutters acting alternately on the blank to cut and finish the thread of the screw, as set forth, all placed upon the same side of the axis of the screw-blank.

THOS. J. SLOAN.

Witnesses:
A. P. BROWNE,
LAFAYETTE CALDWELL.